(12) United States Patent
Sirejacob

(10) Patent No.: US 6,776,834 B2
(45) Date of Patent: Aug. 17, 2004

(54) COMPOSITION FOR TREATING SUBSTRATE AND PROCESS OF TREATMENT

(75) Inventor: Gino Sirejacob, Evergem (BE)

(73) Assignee: ICT Coatings N.V., Deinze (BE)

( * ) Notice: Subject to any disclaimer, the term of this patent is extended or adjusted under 35 U.S.C. 154(b) by 0 days.

(21) Appl. No.: 10/252,748

(22) Filed: Sep. 23, 2002

(65) Prior Publication Data

US 2004/0060476 A1 Apr. 1, 2004

(51) Int. Cl.⁷ .......................... C03C 17/30; C04B 41/49
(52) U.S. Cl. .......................... 106/287.1; 106/287.14; 106/287.16
(58) Field of Search .......................... 106/287.1, 287.14, 106/287.16

(56) References Cited

U.S. PATENT DOCUMENTS

| 4,110,358 A | 8/1978 | Braunwarth | 260/404.5 |
| 4,275,235 A | 6/1981 | Giede et al. | 564/288 |
| 6,300,379 B2 | 10/2001 | Avery | 516/55 |
| 6,379,448 B1 | 4/2002 | Sirejacob | 106/287.12 |

FOREIGN PATENT DOCUMENTS

| DE | 19941753 | 5/2001 | |
| WO | 91/04668 | 4/1991 | A01N/57/34 |
| WO | 91/05003 | 4/1991 | C08G/79/06 |
| WO | WO 0063129 A1 | 10/2000 | |
| WO | 00/63129 | 10/2000 | C03C/17/30 |
| WO | WO 0118321 A1 | 3/2001 | |
| WO | 02/30848 | 4/2002 | C04B/41/84 |
| WO | WO 02088043 A1 | 11/2002 | |

*Primary Examiner*—David Brunsman
(74) *Attorney, Agent, or Firm*—Darby & Darby

(57) ABSTRACT

The composition for treating a siliceous substrate comprises:
  substantially water insoluble fluoro silane;
  an organic solvent in an amount sufficient for solubilizing the fluoro silane, and
  at least one ammonium and/or phosphonium compound, the weight ratio (ammonium and/or phosphonium compound/water insoluble fluoro silane) being greater than 0.005.

83 Claims, No Drawings

COMPOSITION FOR TREATING SUBSTRATE AND PROCESS OF TREATMENT

FIELD OF THE INVENTION

The present invention relates to composition and a process for treating substrates containing silicon (Si), especially siliceous containing substrate, for rendering them water, oil, stain and dirt repellent.

STATE OF THE ART

EP-A-1.171.396 (U.S. Pat. No. 6,379,448) teaches siliceous substrate provided with a fluoro aliphatic silane layer, said layer having excellent mechanical and chemical properties. According to examples, the siliceous substrate is treated with a composition which is prepared before contacting the surface to be treated, by mixing a composition comprising silane and an organic solvent for said silane, and a composition comprising an organic solvent and concentrated hydrochloric acid (HCl). The pot live of the composition when prepared is limited to less than 5 days.

WO 02/30848 teaches a composition for treating a substrate comprising a fluorinated polyether silane, an organic or inorganic acid, water and an organic solvent. Tests have been made by applicant with composition according to said document (composition sold under the trade name ECC-1000). The pot life of the composition is limited whereby the composition has to used in less than 1 day. Furthermore, the layer obtained on a glass substrate with this composition had mechanical properties and chemical resistance properties which were lower than the properties of the layer prepared as taught in EP-A-1.171.396.

U.S. Pat. No. 6,300,379 teaches a method for improving the stability of an aqueous solution comprising a fluoro organo silane, by including in the aqueous composition 1 to 10% by weight based on the total weight of the aqueous solution a surfactant, and 1 to 9% by weight of a glycol ether co-solvent. The amount of fluoro organo silane present in the aqueous composition is comprised between 0.01 and 3%.

The content of said documents is incorporated in the present specification by reference.

Applicant has now discovered that by using a composition containing an organo fluoro silane, an amount of organic solvent sufficient for dissolving the organo fluoro silane and an amount of ammonium or phosphonium compound lower than the amount of organo fluoro silane, it was possible to increase the mechanical properties of the coating and its chemical resistance, even if the organo fluoro silane content of the composition was less than 0.1%. This means that the composition can have a very low content of fluoro silane (while not disturbing the excellent mechanical properties), whereby possible ecological risk can be drastically reduced. Furthermore, it has been observed that compositions substantially water free were still efficient more than 1,2,3 and even 6 months after their preparation, whereby rendering it possible to sell ready to use composition.

BRIEF DESCRIPTION OF THE INVENTION

The invention relates to a composition suitable for improving the properties of the fluoro silane layer, especially the mechanical properties thereof, in particular to improve the abrasion resistance.

The composition for treating a siliceous containing substrate of the invention comprises:

a first amount of a substantially water insoluble fluoro silane (such as disclosed in EP-A-1.171.396), advantageously fluorinated polyether silane (such as disclosed in WO 02/30848) of the formula:

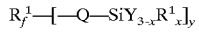

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2;

one or more organic solvents in a quantity sufficient for solubilizing at least substantially completely said first amount of water insoluble polyether silane;

possibly water;

possibly one or more organic or inorganic acid, and one or more compounds comprising one or more ammonium and/or phosphonium groups, the weight ratio [compounds comprising one or more ammonium and/or phosphonium]/[water insoluble fluoro silane] being advantageously greater than 0.005, preferably greater than 0.01.

The composition of the invention is advantageously free of film forming organic polymer, organic polymer and silane without fluoro atoms. The composition of the invention is advantageously also free of organopolysiloxane. According to a detail, the composition of the invention is free or substantially free of water soluble fluoro silane. The composition of the invention comprises thus preferably as material suitable for making a coating or layer on the substrate, substantially only water insoluble fluoro silane.

The pH of the composition (measured at 25° C. by using a LiCl electrode with an open sleeve) is lower than 9, advantageously comprised between 1 and 7.5, preferably comprised between 2 and 7, for example greater than 4 and lower than 7, such as 4, 4.5, 5, 5.5, 6.

According to an embodiment, the amount of ammonium and/or phosphonium compound present in the composition is lower than the first amount, preferably lower than 0.5 time the first amount, most preferably lower than 0.1 time the first amount. It seems that the ammonium and/or phosphonium compound present in the composition acts as a means organizing the reaction of the fluoro organosilane with the face of the siliceous containing substrates, whereby enabling better bonds between the silane layer and the substrate.

The composition of the invention is substantially water free. When the composition is completely water free, the composition is advantageously contacted with the substrate in a humid atmosphere.

The composition of the invention comprises more than 50% by weight organic solvent, advantageously more than 75% by weight, preferably more than 90% by weight, most preferably more than 95% by weight, such as more than 99%, more than 99.5%, or even more than about 99.8%. The composition can be a concentrated composition, for example containing 5% fluoro silane, 1% ammonium/phosphonium compound and 94% organic solvent, said composition being then diluted with organic solvent before its use, so as to apply on the surface to be coated a composition containing advantageously less than 0.5% fluoro silane.

The composition of the invention can comprise one or more carboxylic acids, such as formic acid, citric acid, acetic acid, phthalic acid, tartaric acid, or fluorinated organic acids, such as those disclosed in WO 02/30848. Inorganic acids, such as sulfuric acid, phosphoric acid, hydrochloric acid (HCl), hydrofluoric acid (HF), nitric acid, and mixtures thereof are less preferred. However, the composition can comprise such inorganic acids, especially nitric acid and phosphoric acid. When using acids, the acids or the amount present in the composition will be selected so as to not damage or attack the face to be coated.

The solvent used in the composition of the invention is advantageously selected with the group consisting of aliphatic alcohols, such as methanol, ethanol, isopropylalcohol, ketones, acetone, methyl ethyl ketone, esters, ethers, etc. Suitable organic solvents can be quickly determined by the man skilled in the art by trying to solubilize the water insoluble fluoro silane in the solvent or solvent system he wants to use. Most preferably, the composition comprises at least one halogeno solvent, for example chlorinated solvents, such as chlorinated hydrocarbons, 1,2,2 trichloro-1,1,2-trifluoroethane, fluorinated solvents, such as fluorinated hydrocarbons, hydrofluoroethers, mixtures thereof. Typical examples are perfluorohexane, perflorooctane, pentafluorobutane, $CF_3CFHFHCF_2CF_3$, methylperfluoroethers, ethyl perfluorobutyl ether, trifluoromethyl-3-ethoxydodécafluorhexane, ethyl nonafluoro isobutylether, methyl nonafluoro butyl ether, and mixtures thereof. Preferred fluoro solvents are trifluoromethyl-3-ethoxydodécafluorhexane, ethyl nonafluoro isobutylether, ethyl nonafluoro butylether, methyl nonafluoro butyl ether, methyl nonafluoro isobutyl ether and mixtures thereof.

Advantageously, the ammonium and/or phosphonium compound is present in the composition at least partly in the form of a salt thereof. For example, the ammonium and/or phosphonium compound present in the composition is present in the form of its chloride salt, its formate salt, its acetate salt, etc. Preferably, the ammonium and/or phosphonium salt is selected so as to be solubilized in the organic solvent used for the fluoro silane.

Ammonium and/or phosphonium compound is advantageously a compound of formula

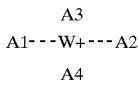

In which W is N or P; A1, A2, A3, A4 (which can be similar or different) represent an hydrocarbon group (linear or branched, saturated or unsaturated, substituted or unsubstituted, for example substituted with one or more hydroxyl groups or with one or more halogen atoms) with 1 to 6 carbon atoms, advantageously with less than 3 carbon atoms.

A1, A2, A3, A4 represent preferably each an alkyl group (linear or branched) with 1 to 6 carbon atoms, advantageously with less than 3 carbon atoms, such as with one or two carbon atoms. A1, A2, A3 and A4 represent advantageously a same alkyl group, such as the methyl group.

Specific examples of suitable compounds are tetramethyl ammonium chloride, tetramethyl ammonium bromide, teramethyl ammonium formate, tetramethyl ammonium hydrate, teramethyl ammonium acetate, tetramethyl ammonium sulfate, tetramethyl phosphonium chloride, tetramethyl phosphonium formate, tetra methyl phosphonium citrate, etc. The production and preparation of ammonium and/or phosphonium compounds can be easily found in the literature. Reference can done to U.S. Pat. No. 4,275,235, U.S Pat. No. 4,110,358, WO 91 05003, WO 91 04668, and the prior art cited in said documents.

The composition of the invention can comprise some amino silane, such as amino alkyl silane or amino propyl alkoxy silane, in particular some amino silane used for the preparation of the fluoro silane or the fluorinated polyether silane. The amino silane present in the composition is for example greater than 0.5% the weight of the fluoro silane present in the composition. The weight ratio amino silane/fluoro silane is advantageously greater than 0.01, preferably greater than 0.02, such as 0.05, 0.1, 0.2 or even more (0.3, 0.5, etc.). The reaction of formation of the fluoro silane is for example controlled so as to obtain an end fluoro silane containing the required amount of amino silane. Amino silane can also be added as such at the end of the reaction so as to control the amount of amino silane present.

The composition of the invention comprises according to specific embodiments water, such as from 0.1% up to 10% by weight, such as between 0.1 and 5%, advantageously less than 3%, preferably less than 2%. According to embodiments, the water content of the composition is lower than the fluoro silane content of the composition, for example lower than the ammonium/phosphonium content of the composition.

The invention relates also to a stable and ready-to-use composition, said liquid composition comprising:

less than 0.5% by weight of a substantially water insoluble fluoro silane, advantageously fluorinated polyether silane of the formula:

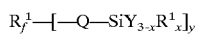

wherein $R_f^1$ represent a monovalent or divalent polyfluoropolyether group, Q represents an organic divalent linking group, R1 represents a C1–C4 alkyl group, Y represents a hydrolysable group, x is 0 or 1 and y is 1 or 2;

more than 50% by weight of one or more organic solvents;

possibly water (preferably free of water);

possibly one or more organic or inorganic acid, and less than 0.5% by weight of one or more compounds comprising ammonium and/or phosphonium.

According to an embodiment, the composition comprises no acid as such, but ammonium and/or phosphonium salts, such as chloride, bromide, formate, acetate, citrate, etc.

The ready-to-use composition of the invention has advantageously one or more characteristics of the composition of the invention.

The invention relates also to a process for coating a face of a silicon (Si) or siliceous containing substrate with a silicon containing layer, in which the face is treated with a composition comprising:

a first amount of a substantially water insoluble fluoro silane, advantageously fluorinated polyether silane of the formula:

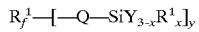

wherein $R_f^1$ represent a monovalent or divalent polyfluoropolyether group, Q represents an organic divalent linking group, R1 represents a C1–C4 alkyl group, Y represents a hydrolysable group, x is 0 or 1 and y is 1 or 2;

one or more organic solvents in a quantity sufficient for solubilizing at least substantially completely said first amount of water insoluble polyether silane;

possibly water;

possibly one or more organic or inorganic acid, and one or more compounds comprising ammonium and/or phosphonium.

The composition used in the process is advantageously a composition of the invention, for example a ready-to-use composition of the invention.

The composition can be applied on various ways on the substrate, such as by contacting the substrate with the liquid composition, by dipping, brushing, spraying, wiping, atomising, flowing, falling, etc.

Advantageously, prior to be contacted with the solution, the said part of the face is washed, for example degreased, while after to be contacted with the solution, the said part of the face is rinsed, for example with a solvent, a polar solvent, especially with the solvent used in the fluoro silane composition. Prior contacting the substrate with the composition of the invention, it is advantageous to treat the surface with a biocide and/or with an ammonium and/or phosphonium compound. When pretreating the substrate, the face of the substrate to be treated is advantageously dried or the possible liquid water present on the face is removed by mechanical action, by adsorption or by physical actions.

According to an embodiment of the process, the drying or curing of the composition is carried out at room temperature. A substantially complete drying or curing of the fluoro silane layer can be reached after about 24 hours.

Preferably, possibly after drying or removal of solvent or water, the said face is subjected to a heat treatment at a temperature from 30° C. up to about 250° C., for example from 40° C. to about 200° C., in an oxidative atmosphere or up to about 350° C. in a non-oxidative atmosphere.

During the contact of the substrate with the composition as well as during the curing step, the atmosphere is controlled. For example, the humidity level of the gas present in the room where the substrate is contacted with the composition. The temperature is also kept advantageously as low as possible, for example at a temperature comprised between 5 and 65° C., such as a temperature comprised between 20 and 50° C. The treatment can be made under pressure.

The siliceous substrate is advantageously selected from the group consisting of glass, glass containing substrates, ceramics and silicate surfaces. Other possible substrates are listed in WO 02/30848, the content of which is incorporated by reference.

Advantageously, the amount of ammonium and/or phosphonium compound present in the composition is lower than the first amount, preferably lower than 0.5 time the first amount, most preferably lower than 0.1 time the first amount. For example, the weight ratio (ammonium compound or phosphonium compound or ammonium+phosphonium compound or mixture thereof)/fluoro silane is 0.05; 0.03; 0.02; 0.01 or even less.

The composition applied on the substrate is substantially water free.

According to a specific embodiment of a process of the invention, the face of the substrate to be treated is first treated with a first composition comprising:
  a first amount of a substantially water insoluble fluoro silane, advantageously a water insoluble fluorinated polyether silane of the formula:

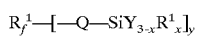

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2;
  one or more organic solvents in a quantity sufficient for solubilizing at least substantially completely said first amount of water insoluble polyether silane;
  possibly water; and
  possibly one or more organic or inorganic acid, and thereafter with a second composition comprising:
    one ammonium and/or phosphonium compound selected from the group consisting of compounds with at least one ammonium group, compounds with at least one phosphonium group, compounds with at least one ammonium group and with at least one phosphonium group, and mixtures thereof, the quantity of said composition being advantageously such that the weight ratio ammonium and/or phosphonium compound of the second composition applied on the substrate/water insoluble fluoro silane present in the first solution applied on the substrate is greater than 0.005.

Advantageously, prior to be contacted with the solution, the said part of the face is washed, for example degreased, while after to be contacted with the solution, the said part of the face is rinsed, for example with a solvent for the fluoro silane compound.

The drying and curing of the composition applied onto the substrate is preferably carried out after removal of the excess of composition present on the substrate, for example by using a wool cloth or fabric, a cotton cloth or fabric, etc. The said cloth or fabric can also be used for ensuring a good application of the composition on the whole surface, especially along the edge of the siliceous substrate. The removal of excess of composition present on the surface can also be removed by applying on said surface water or solvent, such as a large amount of water.

The application, as well as the drying and curing of the composition can be carried at outside temperature in an uncleaned (non-cleaned) atmosphere. For example the application, as well as the drying and curing can be carried out at temperature from –50° C. up to the degradation of the fluoro silane layer. It is obvious that the application and the drying and curing of the composition can be carried out in a cleaned atmosphere. It is for example possible to apply the composition on the glass sheet or glass pieces just after its manufacture, for example after a cooling step.

When the drying is carried out at a lower temperature, the time required for obtaining a sufficient drying and curing will be longer.

The application is for example carried out at a temperature comprised between 0 and 50° C. The drying and curing can also be carried out in this range of temperature.

According to an embodiment of the process, the drying or curing of the composition is carried out at room temperature, without requiring a cleaned atmosphere. A substantially complete drying or curing of the fluoro silane layer can be reached after about 24 hours.

Preferably, possibly after drying or removal of solvent or water, the said face is subjected to a heat treatment at a temperature from 30° C. up to about 250° C., for example from 40° C. to about 200° C., in an oxidative atmosphere or up to about 350° C. in a non-oxidative atmosphere.

The said composition is advantageously at least substantially free of organic polymer, of film forming organic polymer, of silane without fluorine atoms, so that the layer is substantially only formed by fluoro silane.

The drying step can be a mechanical removal of excess of composition and polar solvent present on the siliceous substrate or of an excess of water or solvent (preferably polar solvent) used for rinsing the substrate after being contacted with the composition. However, advantageously, prior to be contacted with the solution, the said part of the face is washed (for example degreased), while after to be contacted with the solution, the said part of the face is rinsed. The drying step is preferably carried out at least partly at a temperature sufficient for making covalent bonds (oxygen bonds) between the layer and the substrate. Said drying can be carried out at a temperature comprised between −20° C. and 250° C. in an oxidative atmosphere and between −20° C. and about 350° C. in a non-oxidative atmosphere. The drying can be done possibly under vacuum.

Before contacting a face of the siliceous substrate with the silane composition, the said face can be partly or completely treated so as to ensure that the surface is dust free, fat free and free of silicone or other compounds grafted to the face of the siliceous substrate on which a fluoro silane layer according to the invention has to be applied, and/or so as to ensure a kind of abrasion of the said face (for example by projection of small high resistant particles or particle dusts, for example of SiC particles or dust).

Such washing or cleaning pretreatment includes ultrasonic cleaning; washing with an aqueous mixture of organic solvent, e.g., a 50:50 mixture of isopropanol:water or ethanol:water; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant, washing the glass with an aqueous solution that may contain a low foaming, easily rinsed detergent, followed by rinsing and drying with a lint-free cloth; and ultrasonic bath treatment in heated (about 50.degree. C.) wash (preferably deionized) water, followed by rinsing and drying. A pre-cleaning with an alcohol-based cleaner or organic solvent prior to washing may be required to remove adhesives from labels or tapes. Cleaning may also advantageously comprise a polishing step. After drying, the base or glass sheet may be washed with a polar solvent, specifically a chlorinated solvent and/or a fluorinated solvent. Alternatively, and preferably, the base is exposed to an oxidizing atmosphere to improve the reactivation of the glass; for example, to a combination of ozone and UV radiation. It is clear that the siliceous substrate or glass can be submitted to various washing and cleaning pretreatments.

For removing silicone oil or compounds possibly grafted to the siliceous substrate, the substrate can be treated with ammonium fluoride solution, potassium hydroxide (at boiling temperature), HF, Silstrip Liquid® of PENN-WHITE (UK), etc.

In the process according to the invention, the composition when being applied on the substrate still contains silane oligomer (product of the condensation of silane monomer or silanol) with up to 6 Si atoms, preferably with up to 3 Si atoms.

Polar solvents (water is not a solvent for the fluoro silane used in the process of the invention) which can be used in the process of the invention are for example halogeno solvents, fluorine-containing polar solvents, aliphatic or aromatic polar solvents, ketones, esters and mixtures thereof, such as alcohol, ethyl acetate, tetrahydrofuran, mono ethylene glycol, diethylene glycol, triethylene glycol, etc. Advantageously, the polar solvent is selected from the group consisting of C1–C6 alkanol, and aliphatic alcohols of the empirical formula:

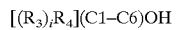

[(R$_3$)$_i$R$_4$](C1–C6)OH wherein R$_3$ and R$_4$ are each C1–C4 alkoxy, and i is the integer 0 or 1, and mixtures thereof. Advantageously, the organic polar solvent has at least one OH group, but preferably only one OH group. Preferred examples of polar solvents are methanol, ethanol, 2-ethoxyethanol, 2-(2-methoxyethoxy) ethanol, 2-methoxy ethanol, 2-(2-ethoxymethoxy) ethanol, 1-propanol, 2-propanol, 1-methoxy-2-propanol, and mixtures thereof (methanol, ethanol, methoxy-ethanol, propanol and mixtures thereof being the most preferred).

Possible halogeno solvents are chlorinated solvents, such as chlorinated hydrocarbons, 1,2,2 trichloro-1,1,2-trifluoroethane, fluorinated solvents, such as fluorinated hydrocarbons, hydrofluoroethers, mixtures thereof. Typical examples are perfluorohexane, perflorooctane, pentafluorobutane, CF$_3$CFHFHCF$_2$CF$_3$, methylperfluoroethers, ethyl perfluorobutyl ether, trifluoromethyl-3-ethoxydodécafluorhexane, ethyl nonafluoro isobutylether, methyl nonafluoro butyl ether, and mixtures thereof. Preferred fluoro solvents are trifluoromethyl-3-ethoxydodécafluorhexane, ethyl nonafluoro isobutylether, methyl nonafluoro butyl ether, and mixtures thereof.

The siliceous containing substrate is preferably contacted with the solution at a temperature comprised between 0 and 50° C., for example at room temperature or at a temperature lower than 15° C. The application can be carried out in a non cleaned atmosphere. Low temperatures are preferred so as to avoid as much as possible cross-linking of silane and so as to reduce as much as possible the formation of larger oligomer in the composition before being applied on the substrate.

In an advantageous embodiment of the process according to the invention, after applying the composition onto a face of the substrate, the said face is submitted to a rubbing with a cloth or fabric, especially with a wool fabric or cloth. It seems that the rubbing of material, such as a wool fabric, suitable for creating static force against the surface of the substrate on which the composition has been applied is advantageous for ensuring an excellent application of the composition onto the said face. The said rubbing can be done manually or mechanically, for example by means of a rotating head provided with a wool fabric.

In an advantageous embodiment of the process, after contacting the said face of the substrate with the composition, the said face is rinsed (for example, by means of water, a polar solvent or a mixture thereof) so as to remove the excess of fluoro silane present on the substrate and dried at least partly at a temperature lower than 50° C. (for example by means of dry air, air having a relative humidity lower than 60%). Preferably, the drying is carried out in a first step by a mechanical treatment so as to remove at most completely the solvent present on the surface of the substrate.

After a possible drying step of the substrate and/or the mechanical removal of the excess of fluoro silane, it is advantageous to submit the face of the substrate to a heat treatment at a temperature above 30° C., for example from 40° C. up to 200° C., so as to increase the formation of bonds (oxygen bonds) of fluoro silane oligomers with the substrate and therebetween. The said heat treatment can be carried out at higher temperature lower than the degradation temperature of the fluoro silane, for example up to 350° C., in a non oxidative atmosphere. In oxidative atmosphere, it is advisable to use about 250° C. as maximum temperature. Such a heat treatment is also a drying step.

The drying step can also be carried out at low temperature, for example at room temperature in a cleaned atmosphere as well as in a non-cleaned atmosphere. In this case, the time necessary for obtaining a sufficient condensation of fluoro silane with the substrate is longer (for example 15 to 36 hours, especially about 24 hours).

The process of the invention can be carried out on various siliceous containing substrates, such as glass, ceramics, ceramics tiles and silicate surfaces.

Examples of possible substrate are:

a glass sheet, glass sheet for a window, a car window, boat window, window of airplanes, control windows of reactors, etc.; the cleaning of the glass sheet being very easy, there are less impacts of insects, less dirt, . . . , especially a wiper blade provided with a fluoro layer or a fluorinated layer (for example a wiper blade according to WO 9812085) is used with such windows;

glasses, wineglasses, etc.; whereby a correct washing of the glasses can be carried by using only water; contact lenses, objectives (for example of microscopes, cameras, etc.);

a solgel containing $SiO_2$ particles;

$SiO_2$ particles used in toner, as additives in organic or inorganic composition, in cement, in paints, in fluidised bed, in filters (as filter cake for example), in screenings, in classifications processes, in heavy media separation processes, etc.;

Lamps, neon lamps, etc.;

Transparent protection sheet of solar electrical cells;

Bottles, vials, tubes, glass syringes, etc., said bottles, vials, tubes, syringes having at least the inner face provided with a fluoro layer and preferably also the outer face provided with a fluoro layer, so that the washing and/or the sterilisation and/or removal of labels, glued labels is easier, the said bottles, vials and tubes being advantageously closed by means of a stopper (for example a rubber stopper) provided with a fluoro layer or a fluorinated layer so as to have a good sealing contact between the stopper and the neck of the bottles, vials or tubes, while the said syringes have advantageously a plunger provided with a fluoro layer or a fluorinated layer so as to have a good sealing and a low friction when moving the plunger;

Glass fibres, such as optical fibres, glass wool for isolation purposes, for filtering purposes, etc;

High voltage isolators;

Kiezelghur particles for example for filtering purposes;

Analysis tube, control tube, level control system;

Reactor, chemical reactor, condensers, falling film exchangers, reactors, absorbers, etc.;

Sanitary installations;

Enamel or porcelain surfaces, such as wash basin or vat, etc.;

Siliceous substrate with an anti adhesion surface for the manufacture of micro lenses, etc.;

Siliceous substrates as casting moulds;

Siliceous packing elements for towers, such as absorption tower;

Earthenware;

Glass films;

Wood,

Silicon containing steel;

Composite materials;

paper containing $SiO_2$;

etc.

The composition of the invention, especially the ready-to-use composition of the invention can be prepared from a kit comprising at least two distinct compartments or chambers, a first comprising one or more solvents, one ammonium and/or phosphonium compound (such as in the form of one of its salts), possibly water and possibly one or more organic or inorganic acids; and the second compartment or chamber comprising the fluoro silane and one or more solvent (especially at least one solvent being a halogeno or halogenated solvent, such as a fluorinated solvent)

DESCRIPTION OF SPECIFIC AND PREFERRED EMBODIMENTS

EXAMPLE 1

A first composition has been prepared by adding absolute ethanol to a solution of silane ether (60% silane/40% ethanol) of the following formula

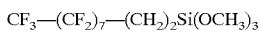

in ethanol.

The composition which was substantially water free (less than 0.1%), was an ethanol solution containing about 0.5% by weight of the said silane ether. Tetra methyl ammonium hydroxide (TMAH) was added to the composition, so that the weight ratio TMA/silane is about 0.1.Formic acid was then added so that the pH of the solution was about 4.5.

The pH was measured by using a Multi-meters pocket "Multiline P4" of WTM sold by VEL (Leuven, BELGIUM) provided with a LiCl electrode (open sleeve electrode, pH Flushtrode with LiCl) of HAMILTON (USA) sold by VEL. Such an electrode is a known electrode for measuring a pH in a polar medium, as well as in a non polar solvent. Even if the pH is measured preferably by using this electrode, other electrodes suitable for measuring pH in polar solvent can be used. The pH was measured at 25° C., even if the Multi-meters apparatus was provided with a system for compensating the variation of the pH in function of the temperature. The apparatus was calibrated by using buffers having respectively a pH of 1.00, 2.00, 3.00, 4.01, 6.99 and 8.98.

The composition was then applied on a glass sheet by dipping the glass sheet in a bath containing the composition. Before applying the composition or fluorosilane solution, the glass sheet was cleaned and degreased by means of an aqueous solution and organic polar solvents.

After dipping, the excess of solution on the glass sheet was removed by rubbing a wool fabric against the glass sheet. Thereafter, the glass sheet was washed with an aqueous alcohol solution.

The so treated glass sheet was then heated at 130° C. during 30 minutes for drying and curing the layer with the substrate (formation of covalent oxygen bonds between the siliceous substrate and the silane layer).

The so obtained layer was a mono layer, having a thickness of lower than 1 $\mu$m (thickness corresponding substantially to the length of $CF_3$—$(CF_2)_7$—$(CH_2)_2$ Si).

Tests have been made on the treated glass in order to determine its properties. The results of these tests are the followings:

Resistance Tests

For these tests, two drops of a fluid have been applied for 1 minutes on the coated glass. A first drop has been removed after a rubbing with a paper cloth and thereafter wiped with cotton, while a second drop was removed without rubbing with a paper cloth and thereafter wiped with cotton. The resistance of the coating to the fluid was determined by checking for tackiness, by examining the crazing, by examining the loss of transparency and hydrophobicity.

The results of these examinations are that the coating has a resistance to various chemicals, namely:

Resistance to boiling water

Resistance to non abrasive soap solution (2% soap content)

Resistance to non abrasive concentrated soap solution (100% soap)

Resistance to alcohol (absolute)

Resistance to isopropanol

Resistance to isoparaffinic hydrocarbon (isopar c)

Resistance to boiling acetone

Resistance to diacetonalcohol

Resistance to methyl ethyl ketone (MEK)

Resistance to sec. Butanol

Resistance to concentrated HCl (37%)

Resistance to sulphuric acid (99%)

Resistance to diluted NaOH (resitance of at least 1 minute after applying at 25° C. an aqueous solution containing 5% NaOH)

Resistance of at least 1 minute to an aqueous solution containing 25% NaOH

Resistance of at least 1 minute to an aqueous solution containing 25% KOH

Resistance to nitric acid (68%)

Resistance to formic acid (99%)

Resistance to gazoline

Resistance to guano

Furthermore, the layer had a resistance of at least 24 hours against the action of concentrated phosphoric acid (99%) at 25° C., as well as at the boiling temperature.

Water-repellent Tests

The layer was still water-repellent after 3000 hours. For said test water is running continuously on the coating from a high of 50 cm, the glass plate being positioned at an angle of 45° with respect to the horizontal.)

The layer has the following characteristics: abrasion resistance, hydrophobicity, oleophobicity, low friction coefficient, clear and transparent appearance, light transmission equivalent to the light transmission of the glass plate before treatment.

Surface Energy Test

Surface energy lower than 12 dynes/cm (6–8 dynes/cm)

Washability Test

This test is used for determining the abrasion resistance (life) of a coating on a substrate. For said test, glass plates (8 cm×40 cm) were coated, while a Braive Instruments washability apparatus (sold by Braive Instruments) was used with the holder ISO. The holder ISO was applied on the substrate with a load of 454 g. The agents used in the test were demineralised water, Vileda abrasive medium (sold by Vileda), and isopropanol.

In this test, a contact angle is measured. The values of the contact angle are put in a diagram (contact angle in function of the number of cycles of washability). When the limit of 85° is reached, the number of cycles is determined.

The glass plates are cleaned with isopropanol and blow dry. The contact angle of the cleaned glass is determined before starting the test. The measurement of the contact angle after a number of washability cycles is always done with the profile of the drop seen from 90° on the direction of the washability movement.

After measuring the initial contact angle, the sample (with the coated face up) is placed on the apparatus, with the sample or plate positioned in the middle of a working station of the apparatus. After fixing the plate, the holder with vileda medium contacts the coated face with a load of 454 g. At each washability cycle, 1 droplet of demineralized water is supplied to the portion of the face in contact with the vileda medium.

After a number of cycles, the contact angle is measured in a portion of the face contacted with the vileda medium. If the contact angle is higher than 85°, the glass plate is further submitted to a number of cycles. This procedure is repeated up to reaching an angle close to 85°.

A hydrophobic glass coating fails when the contact angle drops under 85°. The best abrasion resistance is when a glass coating has the highest number of cycles of washability till reaching a contact angle of 85°.

The abrasion resistance (washability test) of the coating prepared in presence of the ammonium compound was increased by about 25% with respect to a similar coating prepared in the absence of the ammonium compound.

Adhesion Test

The results of this test is that there is a good adhesion of the layer or coating, even after immersion of the glass plate in boiling water for 1 hour. When using the method disclosed in DIN 53151, the edges of the cuts were completely smooth and none of the square of the lattices of the cuts is detached, showing therefore an excellent adhesion.

UV Test

The UV resistance was determined by using the test Q.U.V. FS 40, with successive cycles of 8 hours UV B radiation at 70° C. and 4 hours condensation at 50° C. After 1000 hours, the coating was still water repellent.

Mechanical Test

When using said glass as a car window, it appears that there were less impacts of insects and other dirt, that there was a kind of jumping effect for the particles or insects n the windows, that the cleaning of the window was easier and that a perfect cleaning could be reached with a wiper blade provided with a fluoro or fluorinated layer or coating.

It appears also that in the same cold weather environment (temperature of −5° C.), no freeze was formed on the glass sheet of the invention, while a freeze layer was formed on the non treated glass sheet. The glass sheet of the invention has thus anti freeze properties.

EXAMPLE 2

Example 1 was repeated, except that, instead of dipping, the composition was sprayed on a face of the glass sheet.

EXAMPLE 3

Example 1 was repeated, except that, instead of dipping, the composition was brushed on a face of the glass sheet.

EXAMPLE 4

Example 1 was repeated except that no heat treatment was carried out at 130° C. The drying was carried out at room temperature and was considered as finished after 24 hours. The layer had the same properties than the layer of example 1, except that the delta haze was comprised between 0.2 and 0.3.

EXAMPLE 5

Example 1 was repeated, except that a solution of silane ether of the following formula

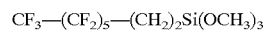

was used.

EXAMPLE 6

Example 1 was repeated, except that the fluoro silane ether composition contains 1% by weight diethyl phthalate (DEP) and that hydrochloric acid was used for lowering the pH of the composition to less than 2.

EXAMPLE 7

A solution of silane ether (60% by weight) of the following formula

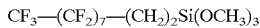
$CF_3—(CF_2)_7—(CH_2)_2Si(OCH_3)_3$ in ethanol with a tetra methyl ammonium hydroxide content of 5% by weight was mixed with ethanol, DEP and citric acid so as to prepare a solution with a pH of about 5, with a fluoro silane ether content of about 0.1% by weight and a DEP content of 0.5%.

The so obtained composition was applied on the glass sheet as in example 1.

EXAMPLE 8

Example 1 was repeated, except that a solution of silane ether of the following formula

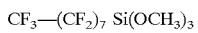
$CF_3—(CF_2)_7\ Si(OCH_3)_3$ was used.

EXAMPLE 9

Example 1 was repeated, except that a solution containing 0.1% by weight of silane ether of the following formula

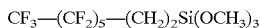
$CF_3—(CF_2)_5—(CH_2)_2Si(OCH_3)_3$ and 0.1% by weight of silane ether of the following formula

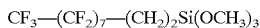
$CF_3—(CF_2)_7—(CH_2)_2Si(OCH_3)_3$ was used.

EXAMPLE 10

Example 1 was repeated, except that the fluoro silane ether is a perfluoro polyetherdisilane PFPES-1 prepared by reacting perfluoropolyetherdiester $CH_3OC(O)CF_2(CF_2O)_{9-11}(CF_2CF_2O)_{9-11}CF_2C(O)OCH_3$ (with an average molecular weight of about 2000) with 3-aminopropyltrimethoxysilane. (see page 12 of WO 02/30848 and U.S. Pat. No. 3,810,874 for the preparation of said compound, the content of said documents being incorporated by reference).

It was observed, as in example 1, that when using ammonium in the composition, it was possible to increase of about 25% the abrasion resistance with respect to a coating not prepared in presence of said ammonium compound.

EXAMPLE 11

Example 10 was repeated, except that the compound PFPES-2 as disclosed in WO 02/30848 was used instead of PFPES-1.

EXAMPLE 12

Example 10 was repeated, except that the compound PFPES-3 as disclosed in WO 02/30848 was used instead of PFPES-1.

EXAMPLE 13

Example 10 was repeated, except that the compound PFPES-4 as disclosed in WO 02/30848 was used instead of PFPES-1.

EXAMPLE 14

Example 10 was repeated, except that the compound PFPES-5 as disclosed in WO 02/30848 was used instead of PFPES-1.

EXAMPLE 15

Example 10 was repeated, except that the compound PFPES-6 as disclosed in WO 02/30848 was used instead of PFPES-1.

EXAMPLE 16

A composition was prepared by dissolving a silane ether of the formula

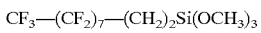
$CF_3—(CF_2)_7—(CH_2)_2Si(OCH_3)_3$ in ethanol, and by mixing to said mixture diethyl phthalate and acetic anhydride. The so obtained solution had the following composition: 0.2% silane, 0.2% diethyl phthalate, 0.2% acetic anhydride, 0.02% tetra methyl ammonium hydroxide and 99.38% ethanol.

EXAMPLE 17

Example 16 was repeated except that PFPES-1 was used as fluoro silane.

EXAMPLE 18

Example 1 was repeated, except that the composition comprises 1% by weight of water (demineralized).

EXAMPLE 19

Example 10 was repeated, except that a mixture 80% alcohol/20% trifluoro-3-ethoxydodecafluorhexane was used as solvent.

EXAMPLE 20

Example 10 was repeated, except that a mixture 80% ethanol/10% ethyl nanofluoro isobutyl ether/10% ethyl nanofluoro butyl ether is used as solvent.

EXAMPLE 21

Example 20 was repeated, except that the composition comprises 0.5% water (demineralized).

EXAMPLE 22

Example 20 was repeated, except that the composition comprises 0.2% water (demineralized).

Tests have shown that even if the concentration of fluoro silane was reduced in the coating composition, the coating had excellent washability properties. The fluoro silane content in the coating composition was for example reduced to 0.2%, 0.15%, 0.1%, 0.08%, 0.06%, 0.04%.

Other anhydrides can be used in example 11, such as maleic anhydride, etc.

Although the examples 1 to 22 described here above contains only ammonium compounds, some solvents and some acids, it is clear that the process according to the invention can be carried out in presence of a mixture of acids, preferably not attacking the glass surface, such as sulphuric acid, nitric acid, organic acids, chlorinated organic acids, for example acetic acid, formic acid, glutaric acid, maleic acid, chloro acetic acid, di chloro acetic acid, chloro formic acid, etc. and/or in presence of mixture of solvents and/or in presence of phosphonium or mixture of ammonium and phosphonium.

If required or necessary, a previously treated glass or siliceous substrate according to the process of the invention can be coated again in accordance to the process of the invention. Such a further coating can be advantageous in case the fluoro silane layer and/or the face of the substrate provided with the fluoro silane layer have been partially or completely damaged, so as to restore the properties of the siliceous substrate of the invention.

Examples of other possible fluorinated silane suitable to be used in the process of the invention are fluorinated silanes of the group fluoroaliphatic polymeric esters, fluorinated alkyl polyoxyethylene ethanols, fluorinated silane of the general formula:

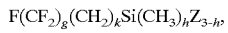

wherein Z is chloro, hydroxy, methoxy or ethoxy, g is an integer selected from the integers 1 to 10, k is the integer 0, 1 or 2, and h is the integer 0, 1 or 2. Examples of such fluorinated silanes include trifluoroacetoxypropyl tri-(C1–C2)alkoxysilanes, 3-(heptafluoroisopropoxy) propyltrichlorosilane, 3-(heptafluoroisopropoxy) propyltriethoxysilane, N-(3-triethoxysilylpropyl) perfluorooctanoamide, N-(3-triethoxysilylpropyl) perfluoro (2,5-dimethyl-3,6-dioxanonanoyl)amide, (tridecafluoro-1,1,2,2-tetrahydrooctyl)-1-dimethylchlorosilane, (tridecafluoro-1,1,2,2-tetrahydrooctyl)-1-methyldichlorosilane, (tridecafluoro-1,1,2,2-tetrahydrooctyl)-1-trichlorosilane, tridecafluoro-1,1,2,2-tetrahydrooctyl-1-triethoxysilane, 3,3,3-trifluoropropyldimethylchlorosilane, (3,3,3-trifluoropropyl)methydichlorosilane, (3,3,3-trifluoropropyl) methyldimethoxysilane, (3,3,3-trifluoropropyl) methyldimethoxysilane, (3,3,3-trifluoropropyl) trichlorosilane, (3,3,3-trifluoropropyl)trimethoxysilane, 1H,1H,2H,2H-perfluoroalkyltriethoxysilane, 1H,1H,2H,2H-perfluorodecyldimethylchlorosilane, 1H,1H,2H,2H-perfluorodecylmethyldichlorosilane, 1H,1H,2H,2H-perfluorotrichlorosilane, 1H,1H,2H,2H-perfluorotriethoxysilane, 1H,1H,2H,2H-perfluorooctylmethyldich lorosilane, 1H,1H,2H,2H-perfluorooctyltrichlorosilane, and 1H,1H,2H,2H-perfluorooctyltriethoxysilane.

However, preferably, the silanes used in the process of the invention are silanes of the above mentioned formula but with k equal to 2 and h equal to 0, and with g an integer from 4 to 9, and mixtures of such silanes.

Examples of possible fluorinated polyether silane are given in WO 02/30848, especially as disclosed from page 4, line 4 of WO 02 30848 up to page 6, line 15 of WO 02 30848.

In the example, the coating was carried out by dipping, brushing and spraying. It is clear that any other conventional coating methods, such as spin coating, roll coating, curtain coating, etc., are suitable for applying the silane layer on the substrate.

It is clear that prior to applying the silane layer onto the substrate, the substrate is advantageously treated with a solution for removing possible coating (silane, silicone oil, glue, etc.) present on the surface. Preferably the substrate is treated with a solution which does not degrade the glass substrate. For example, the glass substrate is first treated by means of a solution containing HCl, citric acid, phosphoric acid, etc. or a solution "SILSTRIP LIQUID"® of PENN-WHITE (UK) so as to remove impurities attached to the substrate.

The curing is preferably carried out by subjecting the silane layer to a heat treatment, for example between 75 and 150° C., preferably between 95 and 140° C. However, other curing methods are possible, such as infrared, ultraviolet, gamma or electron radiation.

In the present specification, reference is made to the measurement of a pH by means of a LiCl electrode provided with an open sleeve (flushtrode of Hamilton, USA). The potential measured by using this electrode is the potential measured against a reference electrode, namely an Ag/AgCl reference electrode, with use of 1 molar LiCl in ethanol as electrolyte. This electrode is known as suitable for measuring a pH in a partially aqueous media, as well as in a polar non-aqueous media. It is obvious that other electrode suitable for determining a pH in a non-aqueous or substantially non-aqueous media can also be used for determining the pH.

What I claim is:

1. A composition for treating a silicon or siliceous containing substrate, said composition comprising at least:
    a first amount of a substantially water insoluble fluoro silane;
    an organic solvent in an amount sufficient for solubilizing the fluoro silane, and
    at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005, in which the ammonium and/or phosphonium compound is a compound of general formula

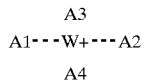

in which W is N or P and
    A1, A2, A3, A4 comprise an hydrocarbon group with 1 to 6 carbon atoms.

2. The composition of claim 1, in which the amount of ammonium and/or phosphonium compound is lower than 0.5 times the first amount.

3. The composition of claim 1, in which the amount of ammonium and/or phosphonium compound is lower than 0.1 times the first amount.

4. The composition of claim 1, which is substantially water free.

5. The composition of claim 1, which comprises more than 75% by weight organic solvent.

6. The composition of claim 1, in which the ammonium and/or phosphonium compound is present in the composition at least partly in the form of a salt thereof.

7. The composition of claim 1, in which the fluoro silane is a fluorinated polyether silane of the formula:

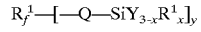

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

8. The composition of claim 1, which is free of water soluble fluoro silane.

9. The composition of claim 1, in which the ammonium and/or phosphonium compound is soluble in the organic solvent.

10. The composition of claim 1, which comprises as solvent at least one fluorinated solvent.

11. A composition for treating a silicon or siliceous containing substrate, said composition comprising at least:
- a first amount of a substantially water insoluble fluoro silane;
- an organic solvent in an amount sufficient for solubilizing the fluoro silane, and
- at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005, in which the ammonium and/or phosphonium compound is a compound of general formula

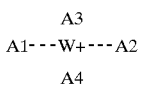

in which W is N or P and
A1, A2, A3, A4 comprise an alkyl group with 1 to 6 carbon atoms.

12. A composition for treating a silicon or siliceous containing substrate, said composition comprising at least:
- a first amount of a substantially water insoluble fluoro silane;
- an organic solvent in an amount sufficient for solubilizing the fluoro silane, and
- at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005,
- said composition comprising more than 90% by weight organic solvent.

13. The composition of claim 12, in which the amount of ammonium and/or phosphonium compound present in the composition is lower than the amount of substantially water insoluble fluoro silane.

14. The composition of claim 12, in which the amount of ammonium and/or phosphonium compound is lower than 0.5 times the first amount.

15. The composition of claim 12, in which the amount of ammonium and/or phosphonium compound is lower than 0.1 times the first amount.

16. The composition of claim 12, in which the ammonium and/or phosphonium compound is a compound of general formula

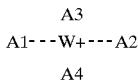

in which W is N or P and
A1, A2, A3, A4 comprise an hydrocarbon group with 1 to 6 carbon atoms.

17. The composition of claim 12, in which the ammonium and/or phosphonium compound is a compound of general formula

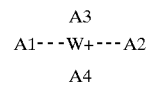

in which W is N or P and
A1, A2, A3, A4 comprise an alkyl group with 1 to 6 carbon atoms.

18. The composition of claim 12, which is substantially water free.

19. The composition of claim 12, which comprises at least one carboxylic acid.

20. The composition of claim 12, in which the ammonium and/or phosphonium compound is present in the composition at least partly in the form of a salt thereof.

21. The composition of claim 12, in which the fluoro silane is a fluorinated polyether silane of the formula:

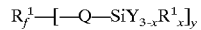

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

22. The composition of claim 12, which comprises less than 1% by weight water insoluble fluoro silane.

23. The composition of claim 12, which is free of water soluble fluoro silane.

24. The composition of claim 12, in which the ammonium and/or phosphonium compound is soluble in the organic solvent.

25. The composition of claim 12, which comprises from 0.1 to 10% water.

26. The composition of claim 12, which comprises as solvent at least one fluorinated solvent.

27. A composition for treating a silicon or siliceous containing substrate, said composition comprising at least:
- a first amount of a substantially water insoluble fluoro silane;
- an organic solvent in an amount sufficient for solubilizing the fluoro silane, at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005, and at least one carboxylic acid.

28. The composition of claim 27, in which the amount of ammonium and/or phosphonium compound present in the composition is lower than the amount of substantially water insoluble fluoro silane.

29. The composition of claim 27, in which the amount of ammonium and/or phosphonium compound is lower than 0.5 times the first amount.

30. The composition of claim 27, in which the amount of ammonium and/or phosphonium compound is lower than 0.1 times the first amount.

31. The composition of claim 27, in which the ammonium and/or phosphonium compound is a compound of general formula

```
     A3
A1---W+---A2
     A4
``` in which W is N or P and

A1, A2, A3, A4 comprise an hydrocarbon group with 1 to 6 carbon atoms.

32. The composition of claim 27, in which the ammonium and/or phosphonium compound is a compound of general formula

```
     A3
A1---W+---A2
     A4
``` in which W is N or P and

A1, A2, A3, A4 comprise an alkyl group with 1 to 6 carbon atoms.

33. The composition of claim 27, which is substantially water free.

34. The composition of claim 27, which comprises more than 75% by weight organic solvent.

35. The composition of claim 27, in which the ammonium and/or phosphonium compound is present in the composition at least partly in the form of a salt thereof.

36. The composition of claim 27, in which the fluoro silane is a fluorinated polyether silane of the formula:

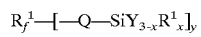

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

37. The composition of claim 27, which comprises less than 1% by weight water insoluble fluoro silane.

38. The composition of claim 27, which is free of water soluble fluoro silane.

39. The composition of claim 27, in which the ammonium and/or phosphonium compound is soluble in the organic solvent.

40. The composition of claim 27, which comprises from 0.1 to 10% water.

41. The composition of claim 27, which comprises as solvent at least one fluorinated solvent.

42. A composition for treating a silicon or siliceous containing substrate, said composition comprising at least:

a first amount of a substantially water insoluble fluoro silane;

an organic solvent in an amount sufficient for solubilizing the fluoro silane, and at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005, wherein the composition comprises less than 1% by weight water insoluble fluoro silane.

43. The composition of claim 42, in which the amount of ammonium and/or phosphonium compound present in the composition is lower than the amount of substantially water insoluble fluoro silane.

44. The composition of claim 42, in which the amount of ammonium and/or phosphonium compound is lower than 0.5 times the first amount.

45. The composition of claim 42, in which the amount of ammonium and/or phosphonium compound is lower than 0.1 times the first amount.

46. The composition of claim 42, in which the ammonium and/or phosphonium compound is a compound of general formula

```
     A3
A1---W+---A2
     A4
``` in which W is N or P and

A1, A2, A3, A4 comprise an alkyl group with 1 to 6 carbon atoms.

47. The composition of claim 42, which is substantially water free.

48. The composition of claim 42, which comprises more than 75% by weight organic solvent.

49. The composition of claim 42, which comprises at least one carboxylic acid.

50. The composition of claim 42, in which the ammonium and/or phosphonium compound is present in the composition at least partly in the form of a salt thereof.

51. The composition of claim 42, in which the fluoro silane is a fluorinated polyether silane of the formula:

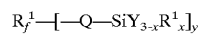

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

52. The composition of claim 42, which is free of water soluble fluoro silane.

53. The composition of claim 42, in which the ammonium and/or phosphonium compound is soluble in the organic solvent.

54. The composition of claim 42, which comprises from 0.1 to 10% water.

55. The composition of claim 42, which comprises as solvent at least one fluorinated solvent.

56. A composition for treating a silicon or siliceous containing substrate, said composition comprising at least:

a first amount of a substantially water insoluble fluoro silane;

an organic solvent in an amount sufficient for solubilizing the fluoro silane, at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005, and from 0.1 to 10% water.

57. The composition of claim 36, in which the amount of ammonium and/or phosphonium compound present in the composition is lower than the amount of substantially water insoluble fluoro silane.

58. The composition of claim 56, in which the amount of ammonium and/or phosphonium compound is lower than 0.5 times the first amount.

59. The composition of claim 56, in which the amount of ammonium and/or phosphonium compound is lower than 0.1 times the first amount.

60. The composition of claim 56, in which the ammonium and/or phosphonium compound is a compound of general formula

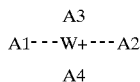

in which W is N or P and

A1, A2, A3, A4 comprise an alkyl group with 1 to 6 carbon atoms.

61. The composition of claim 56, which comprises more than 75% by weight organic solvent.

62. The composition of claim 56, which comprises at least one carboxylic acid.

63. The composition of claim 56, in which the ammonium and/or phosphonium compound is present in the composition at least partly in the form of a salt thereof.

64. The composition of claim 56, in which the fluoro silane is a fluorinated polyether silane of the formula:

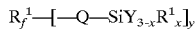

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

65. The composition of claim 56, which comprises less than 1% by weight water insoluble fluoro silane.

66. The composition of claim 56, which is free of water soluble fluoro silane.

67. The composition of claim 56, which comprises as solvent at least one fluorinated solvent.

68. A ready-to-use and stable composition for treating a siliceous containing substrate, said composition comprising:
  less than 0.5% by weight of a substantially water insoluble fluoro silane;
  more than 50% by weight of at least one organic solvent;
  less than 0.5% by weight of at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being greater than 0.005,
  in which the ammonium and/or phosphonium compound is a compound of general formula

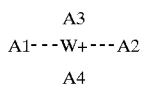

in which W is N or P and

A1, A2, A3, A4 comprise an hydrocarbon group with 1 to 6 carbon atoms.

69. The composition of claim 68, which comprises at least one inorganic acid.

70. The composition of claim 68, in which the amount of ammonium and/or phosphonium compound is lower than 0.1 times the amount of water insoluble fluoro silane.

71. The composition of claim 68, in which the ammonium and/or phosphonium compound is a compound of general formula

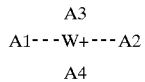

in which A1, A2, A3, A4 comprise an alkyl group with 1 to 6 carbon atoms.

72. Composition for treating a silicon or siliceous containing substrate, said composition comprising at least:
  a first amount of a substantially water insoluble fluoro silane;
  an organic solvent in an amount sufficient for solubilizing the fluoro silane, and
  at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being comprised between 0.005 and 1, in which the ammonium and/or phosphonium compound is a compound of general formula

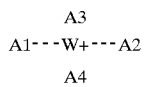

in which W is N or P and

A1, A2, A3, A4 comprise an hydrocarbon group with 1 to 6 carbon atoms.

73. A composition for treating a silicon or siliceous containing substrate, said composition comprising at least:
  a first amount of a substantially water insoluble fluoro silane;
  more than 50% by weight of at least one organic solvent in an amount sufficient for solubilizing the fluoro silane, and
  at least one ammonium and/or phosphonium compound selected from the group consisting of compounds with at least one ammonium group, compounds with at least one phosphonium group, compounds with at least one ammonium group and with at least one phosphonium group, and mixtures thereof, the weight ratio ammonium and/or phosphonium compound/water insoluble fluoro silane being lower than 0.1 times the first amount.

74. The composition of claim 73, which is substantially water free.

75. The composition of claim 73, which comprises at least one carboxylic acid.

76. The composition of claim 73, in which the ammonium and/or phosphonium compound is present in the composition at least partly in the form of a salt thereof.

77. The composition of claim 73, in which the fluoro silane is a fluorinated polyether silane of the formula:

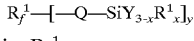

wherein $R_f^1$ represent a monovalent or divalent polyfluoropolyether group, Q represents an organic divalent linking group, $R^1$ represents a C1–C4 alkyl group, Y represents a hydrolysable group, x is 0 or 1 and y is 1 or 2.

78. The composition of claim 73, which comprises less than 1% by weight water insoluble fluoro silane.

79. The composition of claim 73, which is free of water soluble fluoro silane.

80. The composition of claim 73, in which the ammonium and/or phosphonium compound is soluble in the organic solvent.

81. The composition of claim 73, which comprises from 0.1 to 10% water.

82. The composition of claim 73, which comprises as solvent at least one fluorinated solvent.

83. A ready-to-use and stable composition for treating a siliceous containing substrate, said composition comprising:

less than 0.5% by weight of a substantially water insoluble fluoro silane;

more than 50% by weight of at least one organic solvent;

less than 0.5% by weight of at least one ammonium and/or phosphonium compound selected from the group consisting of compounds with at least one ammonium group, compounds with at least one phosphonium group, compounds with at least one ammonium group and with at least one phosphonium group, and mixtures thereof, and at least one carboxylic acid.

* * * * *